United States Patent [19]

Yamashita et al.

[11] Patent Number: 5,266,395

[45] Date of Patent: Nov. 30, 1993

[54] FRICTION MATERIAL FOR MAKING BRAKE PADS

[75] Inventors: Yukinori Yamashita; Mitsuhiko Nakagawa; Masanori Ibuki; Hiroya Kishimoto, all of Hyogo, Japan

[73] Assignee: Sumitomo Electric Industries, Ltd., Osaka, Japan

[21] Appl. No.: 824,754

[22] Filed: Jan. 17, 1992

Related U.S. Application Data

[63] Continuation of Ser. No. 580,125, Sep. 7, 1990, abandoned.

[30] Foreign Application Priority Data

Sep. 18, 1989 [JP] Japan ................................. 1-241570
Jul. 12, 1990 [JP] Japan ................................. 2-185491

[51] Int. Cl.⁵ .................. D04M 1/00; D02G 3/00; F16D 69/00
[52] U.S. Cl. ................... 428/292; 428/361; 428/378; 428/379; 428/401; 428/607; 188/251 A; 188/251 R; 188/251 M; 188/255
[58] Field of Search .............. 428/245, 295, 361, 378, 428/607, 292, 379, 401; 188/251 R, 251 A, 251 M, 255

[56] References Cited

U.S. PATENT DOCUMENTS

| | | | |
|---|---|---|---|
| 3,891,595 | 6/1975 | Birchall | 260/38 |
| 4,125,496 | 11/1978 | McGinnis | 260/17.4 BB |
| 4,197,223 | 4/1980 | Bartram | 260/17.2 |
| 4,244,994 | 1/1981 | Trainor et al. | 428/37 |
| 4,279,696 | 7/1981 | Piersol | 162/146 |
| 4,388,423 | 6/1983 | Kaufman et al. | 523/153 |
| 4,476,256 | 10/1984 | Hamermesh | 523/152 |
| 4,539,240 | 9/1985 | Wargin | 428/64 |
| 4,656,203 | 4/1987 | Parker | 523/155 |
| 4,678,699 | 7/1987 | Kritchevsky et al. | 428/256 |
| 4,973,514 | 11/1990 | Gamble et al. | 428/297 |

FOREIGN PATENT DOCUMENTS 57-200477 12/1982 Japan.
58-29848 2/1983 Japan.
63-862926 3/1988 Japan.

OTHER PUBLICATIONS

This reference has been adequately discussed in the secification, A translation is not readily available.

*Primary Examiner*—George F. Lesmes
*Assistant Examiner*—Terrel Morris
*Attorney, Agent, or Firm*—W. G. Fasse; D. H. Kane, Jr.

[57] ABSTRACT

A friction material for making brake pads or brake disks is formed by mixing metallic fiber and/or aramid fibers as a main component, a filler material and a binder agent for binding the main component and the filler. The metallic fiber includes at least copper fibers and/or copper alloy fibers. The filler includes one or more inorganic substances having a plane netlike crystal structure. The inorganic substances having the plane netlike crystal structure include mica, talc, vermiculite, aluminum hydroxide, magnesium hydroxide, agalmatolite, kaolin, chlorite, sericite, iron hydroxide, and montmorillonite.

7 Claims, No Drawings

FRICTION MATERIAL FOR MAKING BRAKE PADS

This application is a continuation of application Ser. No. 07/580,125, filed on Sep. 7, 1990, now abandoned.

CROSS-REFERENCE TO RELATED APPLICATION

The present application is related to U.S. Ser. No. 07/576,671, abandoned, filed Aug. 31, 1990.

FIELD OF THE INVENTION

The present invention relates generally to friction materials for making brake pads used in friction type brakes for vehicles such as cars, or industrial machines. The present brake pad friction materials are particularly suitable for preventing the generation of low frequency brake noise.

BACKGROUND INFORMATION

Conventionally, asbestos type friction materials containing asbestos as a main component, have been used as friction materials for making brake pads for cars and the like. However, recently, adverse effects of asbestos on humans have been noticed and so-called asbestos-free friction materials not using asbestos have been developed.

For instance, semi-metallic friction materials using short fibers of steel are practically utilized as asbestos-free friction materials. The semi-metallic friction materials have merits such as good resistance to wearing and to fading. However, known semi-metallic friction materials have disadvantages that they might burn when the braking action generates high temperatures and that short fibers of steel contained in friction materials might cause considerable wear on rotors in contact with the brake pad. Thus, there has been a need to develop non-steel friction materials not containing steel fibers as friction materials free of asbestos.

The non-steel friction materials can solve the problems such as burning and wearing of rotors in contact in the semi-metallic friction materials. However, compared with conventional asbestos type friction materials, such non-steel friction materials are liable to cause brake noise at a frequency lower than 1 KHz and, in some cases, there might be vibrations of a car body at the time of braking, which is undesirable. Thus, the non-steel friction materials involve new problems.

SUMMARY OF THE INVENTION

It is an object of the present invention to provide a friction material for brake making pads which does not cause any brake noise at low frequencies when a brake force is applied.

Another object of the present invention is to provide a friction material which can suppress brake noise and nevertheless has a good resistances to wearing and fading.

A further object of the present invention is to provide a friction material for which does not contain asbestos.

A friction material for making brake pads according to the present invention is formed by adding filler to a main material including metallic fibers or aramid fibers, or both of those fibers, and binding the main material and the filler by using a binder. The metallic fiber includes at least copper fibers or copper alloy fibers. The filler comprises one or more materials selected from the group of inorganic materials having a plane netlike crystal structure. Asbestos is not included. The plane netlike crystal structure of the inorganic substances contains radicals of $SiO_4$, polymeric acid radicals of $SiO_4$, and copolymeric acid radicals of $SiO_4$ and $AlO_4$ as main components, and silicic acid radicals having positive ions bound thereto. These components and radicals extend in a two-dimensional plane netlike manner. A more detailed explanation of such inorganic substances is given in Ceramics Handbook edited by Association of Ceramics, pp. 11–18. Other substances having similar crystal structures may be used. In addition to the crystals arrangement in plane layers, these substances also have a slip characteristic or phenomenon in the layers because these layers are bound by a weak van der Waals force.

The inorganic substances having the plane netlike crystal structure include mica, talc, vermiculite, aluminum hydroxide, magnesium hydroxide, agalmatolite, kaolin, chlorite, sericite, iron hydroxide, montmorillonite, etc.

Brake noise of a frequency lower than 1 KHz is considered to be caused by the so-called stick slip phenomenon occurring between the opposite rotor and the friction material of the brake pad or disk.

In general, it is considered that the stick slip phenomenon is likely to occur in friction materials having large static friction coefficients and small dynamic friction coefficients. The conventional asbestos friction materials have small static friction coefficients and small ratios between the small static friction coefficients and the dynamic friction coefficients. Consequently, when an asbestos type friction material pad was actually attached to a wheel brake of a vehicle and a brake noise experiment was performed thereon, a low frequency brake noise was unlikely to occur.

On the other hand, low steel or non-steel friction materials have large static friction coefficients and accordingly large ratios between the static friction coefficients and the dynamic friction coefficients. Consequently, in actual brake noise experiments, the above-mentioned problem of low frequency brake noise occurred.

The friction material for making brake pads according to the present invention uses copper fibers and/or copper alloy fibers, or aramid fibers and/or copper type metallic fibers as the main material, and an inorganic substance having a plane netlike crystal structure as the filler. As a result of various experiments, it was found that inorganic substances having plane netlike silicic acid radicals or similar crystal structures can effectively decrease the static friction coefficients of these friction materials. It was further found that a combination of some of the above-mentioned inorganic substances can further effectively decrease the static friction coefficients of friction materials containing these materials, thereby preventing low frequency brake noise.

The friction material according to the present invention can suppress the occurrence of low frequency brake noise whereby car body vibrations are avoided when the brakes of a vehicle are applied. In addition, the friction material according to the present invention has a good resistances to fading and wearing. Thus, it is possible to solve the wearing problem caused by friction pads with steel fibers which wear out the opposite rotor in contact with conventional friction pads.

DESCRIPTION OF THE PREFERRED EMBODIMENTS AND THE BEST MODE OF THE INVENTION

Performance tests of brake pad friction materials were conducted. For this purpose, asbestos friction materials and asbestos-free friction materials according to the present invention were manufactured. The composition ratios of the respective friction materials are shown in Tables 1-1 to 1-4 and Table 2. In Tables 1-1 to 1-4, embodiments A1 to A7 represent a group of friction materials using only muscovite as the filler; embodiments B1 to B6 represent a group of friction materials using only talc as the filler; embodiments C1 to C11 represent a group of friction materials each containing only the inorganic substances shown in the table; and embodiments D1 to D23 represent friction materials having composition ratios using combinations of various inorganic substances as the filler. Table 2 shows 10 composition ratios of friction materials manufactured for comparison.

Each of the friction materials was manufactured in a manner in which the materials of the composition shown in the corresponding table were mixed and thermally formed and the binder resin in the friction material was cured.

The mixing process was carried out by using a mixer having a chopper rotatable at high speed, whereby all components of the mixture were uniformly distributed in the resulting mixture and so that metallic fibers and the binder are exposed at the surface of the mixture.

The thermal forming process was performed by supplying a prescribed amount of mixed materials into a mold heated at 160° C. and relieving pressure from the mold at suitably timed interval to discharge gases generated by the raw materials from the mold. The pressure was controlled to be constant except for the pressure relieving and the time for pressurization was 10 minutes. The pressure was set so that the molded friction material may have a calculated porosity of 10%. The porosity of each friction material was calculated by a difference between the vacuum degree and the apparent density of the friction material as shown in the following equation.

(vacuum degree)=(apparent density)/
(100−porosity)/100

The vacuum degree of each friction material was calculated according to the corresponding table of the composition ratio based on vacuum degrees of the respective raw materials measured by an instrument of an inert gas replacement type such as a pycnometer. The apparent density was obtained by a volume measurement based on the weight and external size of the friction material.

The curing process was carried out at 230° C. for three hours. The manufactured 47 species of friction materials were subjected to an appearance test in which the presence or absence in cracks of the friction materials was examined. As a result of the appearance test, cracks were found in the friction materials of the specimens A6, D18 and D19. The thermal forming conditions were changed in various manners in order to avoid cracks but as for those specimens, it was not possible to obtain friction materials without cracks.

TABLE 1-1

Composition Ratios of Friction Materials

| raw material | A1 | A2 | A3 | A4 | A5 | A6 | A7 | B1 | B2 | B3 | B4 | B5 |
|---|---|---|---|---|---|---|---|---|---|---|---|---|
| copper fiber | 15 | | | | 5 | 5 | | 10 | | | | 3 |
| brass fiber | | 15 | | 15 | | | | | 10 | | 15 | |
| bronze fiber | | | 15 | | | | 15 | 5 | | 10 | | |
| phlogopite | | | | | | | | | | | | |
| muscovite | 25 | 25 | 25 | 10 | 25 | 25 | 25 | | | | | |
| talc | | | | | | | | 25 | 25 | 10 | 5 | 15 |
| Al(OH)$_3$ | | | | | | | | | | | | |
| vermiculite | | | | | | | | | | | | |
| Mg(OH)$_2$ | | | | | | | | | | | | |
| agalmatolite | | | | | | | | | | | | |
| kaolin | | | | | | | | | | | | |
| sericite | | | | | | | | | | | | |
| chlorite | | | | | | | | | | | | |
| BaSO$_4$ | 12 | 12 | 12 | 22 | 12 | 12 | 12 | 12 | 12 | 17 | 22 | 12 |
| aram fiber | 5 | 5 | 5 | 10 | 5 | 5 | 5 | 5 | 5 | 13 | 10 | 15 |
| caew dust | 10 | 10 | 10 | 10 | 10 | 10 | 10 | 10 | 15 | 7 | 15 | 12 |
| artificial graphite | 8 | 8 | 8 | 8 | 8 | 8 | 8 | 8 | 8 | 8 | 8 | 8 |
| glass fiber | | | | | | 10 | | | | | | |
| steel fiber | | | | | | 10 | | | | | | 10 |
| solid lubricant | | | | | | | | | | | | |
| phenolic resin | 25 | 25 | 25 | 25 | 25 | 25 | 25 | 25 | 25 | 25 | 25 | 25 |

(Note 1) Figures in the table are in vol. %. The brass fiber contains copper of 70 wt. % and zinc of 30 wt. %. The bronze fiber is PBC2C of JIS. The copper-type metallic fiber is 60 μm in diameter and 3 mm long.
(Note 2) The aramid fiber is Kepler pulp of Du Pont.

TABLE 1-2

Composition Ratios of Friction Materials

| raw material | B6 | C1 | C2 | C3 | C4 | C5 | C6 | C7 | C8 | C9 | C10 | C11 |
|---|---|---|---|---|---|---|---|---|---|---|---|---|
| copper fiber | | 10 | 10 | 10 | 10 | 10 | 10 | 10 | 10 | 10 | 10 | 10 |
| brass fiber | | | | | | | | | | | | |
| bronze fiber | | | | | | | | | | | | |
| phlogopite | | 10 | | | | | | | | | | |
| muscovite | | | | | | | 10 | | | | | |
| talc | 30 | | 5 | | | | | | | | | |
| Al(OH)$_3$ | | | | 10 | | | | | | | | |
| vermiculite | | | | | 20 | | | | | | | |
| Mg(OH)$_2$ | | | | | | 30 | | | | | | |
| agalmatolite | | | | | | | | 10 | | | | |
| kaolin | | | | | | | | | | 35 | 10 | |
| sericite | | | | | | | | | | | | 10 |
| montmorillonite | | | | | | | | | 10 | | | |
| BaSO$_4$ | 7 | 33 | 38 | 33 | 23 | 13 | 22 | 22 | 22 | 2 | 22 | 22 |
| aramid fiber | 10 | 5 | 5 | 5 | 5 | 5 | 10 | 10 | 10 | 10 | 10 | 10 |
| cashew dust | 10 | 10 | 10 | 10 | 10 | 10 | 15 | 15 | 15 | 10 | 15 | 15 |
| artificial graphite | 8 | | | | | | | | | | | |
| glass fiber | | | | | | | | | | | | |
| steel fiber | | | | | | | | | | | | |
| solid lubricant | | 7 | 7 | 7 | 7 | 7 | 8 | 8 | 8 | 8 | 8 | 8 |

TABLE 1-2-continued

| | Composition Ratios of Friction Materials | | | | | | | | | | | |
|---|---|---|---|---|---|---|---|---|---|---|---|---|
| | | | | | embodiments | | | | | | | |
| raw material | B6 | C1 | C2 | C3 | C4 | C5 | C6 | C7 | C8 | C9 | C10 | C11 |
| phenolic resin | 20 | 25 | 25 | 25 | 25 | 25 | 25 | 25 | 25 | 25 | 25 | 25 |
| copper powder | 15 | | | | | | | | | | | |

(Note) Figures in the table are in vol. %. The brass fiber contains copper of 70 wt. % and zinc of 30 wt. %. The bronze fiber is PBC2C of JIS. The copper type metallic fiber is 60 μm in diameter and 3 mm long.

TABLE 1-3

| | Composition Ratios of Friction Materials | | | | | | | | | | | |
|---|---|---|---|---|---|---|---|---|---|---|---|---|
| | | | | | | embodiments | | | | | | |
| raw material | D1 | D2 | D3 | D4 | D5 | D6 | D7 | D8 | D9 | D10 | D11 | D12 |
| copper fiber | 3 | 5 | 10 | 17 | 10 | 10 | 5 | 10 | 5 | 10 | 10 | 5 |
| brass fiber | | 5 | | | | 5 | 2 | | | | | |
| bronze fiber | | | | | | | | | | | | |
| phlogopite | 10 | | 10 | 5 | 10 | | 4 | 25 | | | | |
| muscovite | | | | | | | | | | 10 | 15 | 5 |
| talc | | 3 | | 3 | 5 | | 15 | 2 | 40 | | | |
| Al(OH)$_3$ | 28 | | 10 | | 5 | | | 5 | | | | |
| vermiculite | | 25 | | | 5 | | | | | | | |
| Mg(OH)$_2$ | 5 | | | | 5 | | | | | | | 5 |
| agalmatolite | | | | | | | | | | | | 15 |
| kaolin | | | | | | | | | | 5 | | |
| sericite | | | | | | | | | | | | |
| chlorite | | | | | | | | | | | 5 | 5 |
| BaSO$_4$ | 10 | 18 | 20 | 13 | 17 | 21 | 26 | 12 | 3 | 17 | 19 | 7 |
| aramid fiber | 3 | 5 | 7 | 15 | 10 | 5 | 7 | 5 | 5 | 10 | 10 | 10 |
| cashew dust | 8 | 10 | 14 | 18 | 15 | 12 | 10 | 10 | 14 | 15 | 10 | 15 |
| artificial graphite | | | | | | | | | | | | |
| glass fiber | | | | | | | | | | | | |
| steel fiber | | | | | | | | | | | | |
| solid lubricant | 8 | 7 | 7 | 4 | 8 | 7 | 6 | 6 | 8 | 8 | 6 | 8 |
| phenolic resin | 25 | 22 | 22 | 25 | 25 | 25 | 25 | 25 | 25 | 25 | 25 | 25 |

(Note 1) Figures in the table are in vol. %. The brass fiber contains copper of 70 wt. % and zinc of 30 wt. %. The bronze fiber is PBC2C of JIS. The copper-type metallic fiber is 60 μm in diameter and 3 mm long.

TABLE 1-4

| | Composition Ratios of Friction Materials | | | | | | | | | | | |
|---|---|---|---|---|---|---|---|---|---|---|---|---|
| | | | | | | embodiments | | | | | | |
| raw material | D13 | D14 | D15 | D16 | D17 | D18 | D19 | D20 | D21 | D22 | D23 | D24 |
| copper fiber | 5 | 10 | 5 | 5 | 5 | 10 | 10 | | 10 | 8 | 8 | 5 |
| brass fiber | | | | | | | | 3 | | | | |
| bronze fiber | | | | | | | | | | | | |
| phlogopite | | | | | | 35 | 10 | 10 | | | 28 | 15 |
| muscovite | 10 | | | | | | | | | | | |
| talc | 5 | | 10 | | 5 | 5 | | 5 | 28 | | 24 | |
| Al(OH)$_3$ | | 5 | | | | | | | | 35 | | |
| vermiculite | | | | | | | 35 | | 5 | | | |
| Mg(OH)$_2$ | | | | | 15 | | | | | 17 | | |
| agalmatolite | | | | 10 | | | | | | | | |
| kaolin | | 5 | 10 | | | | | | | | | |
| sericite | 10 | | 5 | 10 | | | | | | | | |
| chlorite | 5 | 10 | | | | | | | | | | |
| iron hydroxide | | | | | | | | | | | | 15 |
| BaSO$_4$ | 7 | 12 | 12 | 17 | 17 | 3 | 2 | 15 | 10 | | | 14 |
| aramid fiber | 10 | 10 | 10 | 10 | 10 | 5 | 5 | 10 | 5 | 5 | 5 | 10 |
| cashew dust | 15 | 15 | 15 | 15 | 15 | 10 | 8 | 10 | 10 | 8 | 8 | 10 |
| artificial graphite | | | | | | | | | | | | |
| glass fiber | | | | | | | | | | | | |
| steel fiber | | | | | | | | | | | | |
| solid lubricant | 8 | 8 | 8 | 8 | 8 | 7 | 5 | 7 | 7 | 5 | 5 | 7 |
| phenolic resin | 25 | 25 | 25 | 25 | 25 | 25 | 25 | 25 | 25 | 22 | 22 | 24 |

(Note 1) Figures in the table are in vol. %. The brass fiber contains copper of 70 wt. % and zinc of 30 wt. %. The bronze fiber is PBC2C of JIS. The copper-type metallic fiber is 60 μm in diameter and 3 mm long.

TABLE 2

| | Composition Ratios of Friction Materials | | | | | |
|---|---|---|---|---|---|---|
| raw material | comparison example 1 | comparison example 2 | comparison example 3 | comparison example 4 | comparison example 5 | comparison example 6 |
| copper fiber | | 5 | | 15 | 20 | |
| brass fiber | | | 5 | | | 3 |
| copper powder | | | | | | |

TABLE 2-continued

| | Composition Ratios of Friction Materials | | | | | |
|---|---|---|---|---|---|---|
| raw material | comparison example 1 | comparison example 2 | comparison example 3 | comparison example 4 | comparison example 5 | comparison example 6 |
| muscovite | | | | 5 | 45 | |
| artificial graphite | 8 | 8 | 8 | 8 | | |
| barium sulfate | 22 | 22 | 27 | 22 | | 25 |
| aramid fiber | | 10 | 10 | 10 | 5 | |
| cashew dust | 10 | 15 | 10 | 15 | 5 | 10 |
| asbestos | 35 | | | | | 30 |
| steel fiber | | | 15 | | | |
| phenolic resin | 25 | 25 | 25 | 25 | 25 | 25 |
| rock wool | | 10 | | | | |
| glass fiber | | 5 | | | | |
| solid lubricant | | | | | | 7 |

(Note) Figures in the table are in vol. %. The brass fiber contains copper of 70 wt. % and zinc of 30 wt. %.

Next, with regard to the friction materials of the embodiments A1 to A5, A7, and B1 to B6 and the examples 1 to 4 for comparison, the static friction coefficients $\mu s$ and dynamic friction coefficients $\mu d$ thereof were measured. The measurement was carried out by setting the temperature of the respective opposite rotors to 50° C. and pressing the friction materials against the opposite rotors with a surface pressure of 10 kg/cm². The results of the measurement are shown in Table 3 showing the static friction coefficients and the respective ratios R between the static friction coefficients and the dynamic friction coefficients. From the results of the measurements, it was found that the friction materials of the examples 2 to 4 for comparison and the embodiment A4 had R-ratios larger than those of the other specimens. It was also found that the friction materials of the embodiments A1, A2, A5, B1, B2 and B5 containing mica or talc, and the friction material of the example 1 for comparison containing asbestos had smaller values of the static friction coefficients $\mu s$ and also smaller values of the R-ratios of the friction coefficients.

TABLE 3

| Results of Measurements of the Friction Coefficients of Respective Friction Materials | | |
|---|---|---|
| friction material | $\mu s$ | $(\mu s/\mu d)$ R |
| A1 | 0.31 | 1.02 |
| A2 | 0.35 | 1.07 |
| A3 | 0.40 | 1.10 |
| A4 | 0.40 | 0.15 |
| A5 | 0.39 | 0.12 |
| A7 | 0.40 | 1.14 |
| B1 | 0.32 | 1.03 |
| B2 | 0.34 | 1.06 |
| B3 | 0.38 | 1.10 |
| B4 | 0.40 | 1.14 |
| B5 | 0.38 | 1.09 |
| B6 | 0.34 | 1.10 |
| comparison example 1 | 0.38 | 0.91 |
| comparison example 2 | 0.45 | 1.27 |
| comparison example 3 | 0.45 | 1.31 |
| comparison example 4 | 0.45 | 1.21 |

After the foregoing, a brake noise test was performed by using cars with a 2000 cc engine. Table 4 shows a braking schedule of this test.

TABLE 4

| | Braking Schedule for a Brake Noise Test | |
|---|---|---|
| | 1. burnishing | 2. braking test |
| braking conditions | initial speed: 40 km/h final speed: 0 km/h deceleration: 0.3 G number of braking operations: 30 temperature before start | initial speed: 40 km/h final speed: 0 km/h deceleration: 0.2 G–0.6 G number of braking operations: 140 temperature before start |

TABLE 4-continued

| Braking Schedule for a Brake Noise Test | |
|---|---|
| 1. burnishing | 2. braking test |
| of braking: 100° C. | of braking: 40–200° C. |

(Note) Conditions of the braking test were set by combination of the deceleration and temperature before starting a braking action.

The brake noise was measured by using a vibration pickup and vibrations were separated into 20 Hz to 1 KHz components through a bandpass filter. Whenever a vibration larger than a prescribed level occurred, the occurrence of a brake noise was counted and the brake noises occurring during the braking test were separated into law-frequency brake noises and ordinary brake noises, whereby a ratio of occurrence of low-frequency brake noises was calculated. The results are shown in Tables 5-1 to 5-4 and Table 6. By comparison between Tables 5-1, 5-2 and Table 3, it is understood that the values of the ratios R of the friction coefficients of the friction materials and the ratios of the occurrence of low-frequency brake noises are in proportional relation. Thus, it was found that the smaller the ratio R of the friction coefficients of the friction material is, the smaller the ratio of the occurrence of low-frequency brake noises is.

TABLE 5-1

| Results of Brake Noise | |
|---|---|
| Noise Test | |
| embodiment No. | noise occurence ratio [%] |
| A1 | 0 |
| A2 | 0 |
| A3 | 0.7 |
| A4 | 4.3 |
| A5 | 1.4 |
| A6 | not manufactured |
| A7 | 1.4 |

TABLE 5-2

| Results of Brake | |
|---|---|
| Noise Test | |
| embodiment No. | noise occurrence ratio [%] |
| B1 | 0 |
| B2 | 0 |
| B3 | 1.4 |
| B4 | 3.6 |
| B5 | 0.7 |
| B6 | 1.4 |

TABLE 5-3

| embodiment No. | noise occurrence ratio [%] |
|---|---|
| Results of Brake Noise Noise Test (1/2) | |
| C1 | 7.1 |
| C2 | 6.4 |
| C3 | 7.9 |
| C4 | 9.3 |
| C5 | 8.6 |
| C6 | 7.1 |
| Results of Brake Noise Test (2/2) | |
| C7 | 8.6 |
| C8 | 9.3 |
| C9 | 6.4 |
| C10 | 8.6 |
| C11 | 7.9 |

TABLE 5-4

| embodiment No. | noise occurrence ratio [%] |
|---|---|
| Results of Brake Noise Test (1/2) | |
| D1 | 0 |
| D2 | 0.7 |
| D3 | 0 |
| D4 | 0 |
| D5 | 0 |
| D6 | 0.7 |
| D7 | 0 |
| D8 | 0 |
| D9 | 0 |
| Results of Brake Noise Test (2/2) | |
| D10 | 0.7 |
| D11 | 0 |
| D12 | 0 |
| D13 | 0 |
| D14 | 0 |
| D15 | 0.7 |
| D16 | 0.7 |
| D17 | 0 |
| D18 | not manufactured |
| D19 | not manufactured |
| D20 | not manufactured |
| D21 | |
| D22 | |
| D23 | |
| D24 | 0.7 |

TABLE 6

| embodiment No. | Results of Brake Noise Test noise occurrence ratio |
|---|---|
| 1 | 0 |
| 2 | 25 |
| 3 | 16.4 |
| 4 | 14.3 |
| 5 | not manufactured |
| 6 | 0 |

By comparison between Tables 5-1 to 5-4 and Table 6, the following features are made clear.

Case [1] Only one type of an inorganic substance having a plane netlike crystal structure, is used as the filler.

As understood that the low frequency noise occurrence ratio is reduced in any of the cases of using, as the filler, mica (embodiments A1 to A7), talc (embodiments B1 to B7) and the other inorganic substance (embodiments C1 to C11) compared with the cases not containing such inorganic substances in the filler, namely examples 2 to 5 for comparison. Particularly, in the case of using mica or in the case of using talc, the low-frequency noise occurrence ratio has been remarkably reduced. In the examples 1 and 6 for comparison, asbestos was used and in those cases, brake noise did not occur as mentioned previously. In addition, as for the group using mica, the low-frequency brake noise occurrence ratio in the case of a low content of mica, embodiment A4, was relatively high compared with the other embodiments of this group. Similarly, in the group using talc, the case of a small content of talc, embodiment B4 showed a relatively high brake noise occurrence ratio. In the embodiments A5 and B5, steel fiber was further added as the metallic fiber in addition to copper fiber or copper alloy fiber. In those cases, the low-frequency brake noise occurrence ratio was relatively high compared with the embodiments not containing steel fiber.

From the results of the above-mentioned performance tests of the friction materials for making brake pads, the following points are made clear.

(1) Copper fiber or copper alloy fiber contained in the friction material is desirably in the range of 3 to 40 vol. %.

(2) Muscovite contained in the friction material is desirably in the range of 10 to 40 vol. % and more desirably in the range of 15 to 35 vol. %. A quantity of less than 10 vol. % would achieve little effect in suppressing the occurrence of low-frequency brake noise and a quantity of more than 40 vol. % would make it difficult to thermally form the friction material.

Similarly, talc contained in the friction material is desirably in the range of 3 to 40 vol. % and more desirably in the range of 5 to 30 vol. %. A quantity of less than 3 vol. % would achieve little effect of suppressing the occurrence of low-frequency brake noise and a quantity of more than 30 vol. % would make it difficult to thermally form the friction material.

(3) Copper fiber or copper alloy fiber contained in the friction material has desirably an aspect or length to diameter ratio of 20 or more and a fiber diameter of 200 μm or less.

(4) Mica may be selected from minerals of an aluminum silicate system occurring naturally, such as muscovite, phlogopite or biotite in scaly form having cleavages.

(5) The grain diameter is desirably larger than 350 mesh and smaller than 10 mesh, and grains of such diameter exist desirably in more than 50% of the whole mica content. Grains having a diameter larger than 10 mesh would considerably lower the formability of the friction material and grains having a diameter smaller than 500 mesh would achieve little effect in suppressing low-frequency brake noise.

Case [2] Two or more different inorganic substances having a plane netlike crystal structure are used as the filler in embodiments D1 to D23.

In this second case, it is made clear by comparison between Table 6 and Tables 5-1 to 5-3 that the low-frequency brake noise occurrence ratio is further reduced and becomes substantially equal to zero.

Agalmatolite to be used may be any of naturally occurring minerals having as a main component any of pyrophyllite, kaolin and sericite. Kaolin to be used may be kaolinite.

The friction materials of the embodiments D18 and D19 are difficult to form or mold into a prescribed form as described previously, because if a large quantity of mica or virmiculite is used, the binder would have an insufficient binding force and if a quantity of the binder is considerably increased, the quantity of the binder would exceed a permissible value for forming a friction material. Therefore, the upper limit quantity of mica or vermiculite is 30 vol. %. If the added quantity of mica is too small, low-frequency brake noise could not be effectively suppressed.

A fading test was conducted with respect to the embodiments D2, D4, D5, D7, D8, D10, D12 and the embodiment C5. A fading phenomenon or characteristic is a phenomenon in which the braking effect is lowered if a rapid temperature rise occurs as a result of a continuous use of the brake pad. Table 7 shows the braking schedule for the fading test.

TABLE 7

| | Braking Test of Fading Test | |
|---|---|---|
| | 1. burnishing | 2. fading test |
| braking conditions | initial speed: 65 km/h<br>final speed: 0 km/h<br>deceleration: 0.35 g<br>number of braking operations: 35<br>temperature before braking: 120° C. | initial speed: 100 km/h<br>final speed: 0 km/h<br>deceleration: 0.45 g<br>number of braking operations: 10<br>temperature before first braking: 65° C. |

The test was carried out by using a dynamometer simulating a car of having a 2000 cc engine in accordance with JASO C406-82. The applied moment of inertia was 5 kg.m.s$^2$, and brake discs actually manufactured were utilized. The minimum values of the friction coefficients of the respective embodiments among the 10 braking operations of the fading test were taken out and the results are shown in Table 8. As can be seen from Table 8, the minimum friction coefficient in the embodiment D9 containing talc of 40 vol. % and the minimum friction coefficient in the embodiment C5 containing Mg(OH)$_2$ of 30 vol. %, are smaller than the minimum friction coefficients of the other embodiments.

TABLE 8

| Results of Fading Tests | |
|---|---|
| embodiment No. | minimum friction coefficient in fading test |
| D2 | 0.23 |
| D4 | 0.22 |
| D5 | 0.25 |
| D7 | 0.24 |
| D8 | 0.21 |
| D9 | 0.09 |
| C5 | 0.09 |
| D10 | 0.10 |
| D12 | 0.14 |

In addition, a wearing test was carried out with the embodiments D1, D3, D5, D8, D22 and the embodiments C3, C5. The wearing conditions of the test are shown in Table 9. The applied moment of inertia was 4 kg.m.s$^2$ and brake discs actually manufactured were utilized.

TABLE 9

| Conditions of Wearing Test |
|---|
| initial speed: 70 km/h<br>final speed: 0 km/h<br>deceleration: 0.30 g |

TABLE 9-continued

| Conditions of Wearing Test |
|---|
| number of braking operations: 500<br>temperature before braking: 200° C. |

The results of the wearing tests are shown in Table 10 showing that the embodiment C5 containing Mg(OH)$_2$ of 30 vol. % and the embodiment D22 containing Al(OH)$_3$ of 35 vol. %, had larger wear losses of pads compared with the other embodiments.

TABLE 10

| Results of Wearing Test | |
|---|---|
| embodiment No. | pad wear loss (mm) |
| D1 | 0.12 |
| D3 | 0.18 |
| D5 | 0.08 |
| D8 | 0.11 |
| C3 | 0.07 |
| C5 | 0.53 |
| D22 | 0.46 |

In addition, a test for determining the wear caused by these materials on the opposite rotor of a brake was carried out with respect to the embodiments D1, D4, D6, D20 and the example 6 for comparison. The conditions of the test are shown in Table 11. The applied moment of inertia was 4 kg.m.s$^2$, and brake discs actually manufactured were utilized.

TABLE 11

| Conditions of Opposite Rotor's Aggressivity Test |
|---|
| initial speed: 100 km/h<br>final speed: 0 km/h<br>deceleration: 0.30 g<br>number of braking operations: 500 times<br>temperature before braking: 100° C. |

The results of the test are shown in Table 12 showing that the embodiment D20 including a large quantity of steel fiber as the main material had a larger wear loss of the rotor compared with the other embodiments. This was caused by the hardness of the steel fiber and it is the same with the case of steel powder. Therefore, preferably, the main material does not contain steel.

The embodiment D22 is the case in which a large quantity of aluminum hydroxide is added. In this case, the wear loss of the pad was increased. Therefore, the upper limit quantity of aluminum hydroxide is 30 vol. %. In order to suppress low-frequency brake noise, it is preferable to add aluminum hydroxide of more than 3 vol. %.

TABLE 12

| Wear Loss of Opposite Rotor | |
|---|---|
| embodiment No. | rotor wear loss (gr) |
| embodiment D1 | 0.8 |
| D4 | 0.7 |
| D6 | 1.2 |
| comparison example 6 | 0.9 |
| embodiment D20 | 3.2 |

By the above-described performance tests of the friction materials for brakes, the following points are made clear.

(1) Copper or copper alloy fiber contained in the friction material is desirably in the range of 2 to 20 vol. %.

(2) Mica contained in the friction material is desirably in the range of 4 to 30 vol. %. A quantity of less than 4 vol. % would achieve little effect in suppressing low-frequency brake noise and a quantity of more than 30 vol. % would make it difficult to form or mold the friction material. Preferably the quantity of mica is in the range of 5 to 25 vol. %.

(3) talc, montmorillonite and iron hydroxide contained in the friction material are desirably in the range of 2 to 25 vol. %, respectively. A quantity of less than 2 vol. % of such materials would achieve little effect in suppressing low-frequency brake noise and a quantity of more than 25 vol. % would deteriorate the fading resistance property. Preferably those materials are in the range of 2 to 20 vol. %.

(4) Aluminum hydroxide contained in the friction material is desirably in the range of 3 to 30 vol. %. A quantity of less than 3 vol. % would achieve little effect in suppressing low-frequency brake noise and a quantity of more than 30 vol. % would deteriorate the wear resistant property. Preferably, the quantity of aluminum hydroxide is in the range of 5 to 5 vol. %.

(5) The grain diameter of mica is desirably larger than 44 $\mu$m and smaller than 840 $\mu$m. A grain diameter larger than 840 $\mu$m would considerably lower the formability of a friction material and a grain diameter smaller than 44$\mu$m would achieve little effect in suppressing low-frequency brake noise.

(6) The grain diameter of vermiculite is desirably larger than 44$\mu$m and smaller than 1.7 mm. A grain diameter larger than 1.7 mm would considerably deteriorate the formability of a friction material and a grain diameter smaller than 44 $\mu$m would achieve little effect in suppressing low-frequency brake noise.

(7) If mica and talc are used together, the ratio of mica and talc is preferably 1:4 to 1:12.

(8) If mica and aluminum hydroxide are used together, the ratio of mica and aluminum hydroxide is preferably 1:3 to 1:5.

(9) Magnesium hydroxide contained in the friction material is desirably in the range 3 to 25 vol. %. A quantity of less than 3 vol. % would achieve little effect in suppressing low-frequency brake noise and a quantity of more than 25 vol. % would deteriorate the wear resistant property. Preferably, the quantity of magnesium hydroxide is in the range of 5 to 20 vol. %.

(10) Kaolin contained in the friction material is desirably in the range of 3 to 30 vol. %. A quantity of less than 3 vol. % would achieve little effect in suppressing low-frequency brake noise and conversely a quantity of more than 30 vol. % would considerably wear the opposite rotor. Preferably, the quantity of kaolin is in the range of 5 to 25 vol. %.

The term "brake pad" as used herein is intended to encompass brake disks.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mixed brake friction material, consisting of metallic fibers and aramid fibers for reinforcement, a mica filler present within the range of 10 to 40 vol. % of said mixed friction material for improved friction characteristics, and a cured binding material for bonding said metallic fibers, said aramid fibers, and said filler to each other, said metallic fibers having a diameter of 200 $\mu$m at the most and an aspect ratio of at least 20, said metallic fibers, said aramid fibers, and said filler being uniformly distributed throughout said mixed brake friction material so that said metallic fibers, said aramid fibers, and said filler are exposed at surfaces of said mixed brake friction material, said metallic fibers being selected from the group consisting of copper fibers and copper alloy fibers, and wherein said mica filler has a plane netlike crystal structure, whereby said mixed brake friction material has a suppression characteristic for suppressing low frequency brake noise.

2. A mixed brake friction material, consisting of metallic fibers and aramid fibers for reinforcement, a filler for improved friction characteristics, and a cured binding material for bonding said metallic fibers, said aramid fibers, and said filler to each other, said metallic fibers having a diameter of 200 $\mu$m at the most and an aspect ratio of at least 20, said metallic fibers, said aramid fibers, and said filler being uniformly distributed throughout said mixed brake friction material so that said metallic fibers, said aramid fibers, and said filler are exposed at surfaces of said mixed brake friction material, said metallic fibers being selected from the group consisting of copper fibers and copper alloy fibers, and wherein said filler is talc having a plane netlike crystal structure, whereby said mixed brake friction material has a suppression characteristic for suppressing low frequency brake noise, wherein said talc filler is within the range of 3 to 40 vol. % of said mixed brake friction material.

3. A mixed brake friction material, consisting of aramid fibers for reinforcement, a filler for improved friction characteristics, and a cured binding material for bonding said aramid fibers and filler to each other, said aramid fibers and said filler being uniformly distributed throughout said mixed brake friction material so that said aramid fibers and said filler are exposed at surfaces of said mixed brake friction material, and wherein said filler is an inorganic substance having a plane netlike crystal structure, excluding asbestos, whereby said mixed brake friction material has a suppression characteristic for suppressing low frequency brake noise, and wherein said filler comprises at least one silicate selected from the group consisting of mica, talc, vermiculite, agalmatolite, kaolin, chlorite, sericite, and montmorillonite, and at least one hydroxide selected from the group consisting of aluminum hydroxide, magnesium hydroxide, and iron hydroxide.

4. The mixed brake friction material of claim 3, wherein said filler is within the range of 6 to 50 vol. % of said mixed brake friction material.

5. The mixed brake friction material of claim 3, wherein said filler is mica within the range of 10 to 40 vol. % of said mixed brake friction material.

6. The mixed brake friction material of claim 3, wherein said filler is talc within the range of 3 to 40 vol. % of said mixed brake friction material.

7. A mixed brake friction material, consisting of metallic fibers, aramid fibers, and glass fibers for reinforcement, a filler for improved friction characteristics, and a cured binding material for bonding all said fibers and said filler to each other, said fibers and said filler being uniformly distributed throughout said mixed brake friction material so that said fibers and said filler are exposed at surfaces of said mixed brake friction material, said metallic fibers being selected from the group consisting of copper fibers and copper alloy fibers, and wherein said filler is an inorganic substance having a plane netlike crystal structure, excluding asbestos, whereby said mixed brake friction material has a suppression characteristic for suppressing low frequency brake noise, and wherein said filler comprises at least one silicate selected from the group consisting of mica, talc, vermiculite, agalmatolite, kaolin, chlorite, sericite, and montmorillonite, and at least one hydroxide selected from the group consisting of aluminum hydroxide, magnesium hydroxide, and iron hydroxide.

* * * * *

UNITED STATES PATENT AND TRADEMARK OFFICE
CERTIFICATE OF CORRECTION

PATENT NO. : 5,266,395
DATED : November 30, 1993
INVENTOR(S) : Yukinori Yamashita, et al It is certified that error appears in the above-indentified patent and that said Letters Patent is hereby corrected as shown below:

On the title page, please add to the list of References Cited:
US Patent 4,792,361   12/88 Double et al   106/97-- under Foreign Patent Documents, please correct
"63-862926   3/1988   Japan"
to read --63-62926   3/1988   Japan--;

Under "Other Publications" delete both lines and insert:
--Ceramics Handbook edited by the Association of Ceramics, pages 11-18--;

Column 3, line 19, delete "10",
line 35, replace "interval" by --intervals--;
line 36, replace "from" by --in--;

Column 4, line 13, replace "in cracks of" by --of cracks in--;

Table 1-1, in column 4, under "raw material" line 15, replace "aram fiber" by --aramid fiber--;
under "raw material" line 16, replace "cuew dust" by --cashew dust--;

Table 3, last column (Column 7, line 45) replace "0.15" by --1.15--;  (Column 7, line 46) replace "0.12" by -1.12--;

UNITED STATES PATENT AND TRADEMARK OFFICE
CERTIFICATE OF CORRECTION

PATENT NO. : 5,266,395
DATED : November 30, 1993
INVENTOR(S) : Yukinori Yamashita, et al It is certified that error appears in the above-indentified patent and that said Letters Patent is hereby corrected as shown below:

Table 4, in column 7, line 66, replace "deceluration: 0.3G deceleration: 0.2G-0.6G" by --deceleration: 0.3g deceleration: 0.2g-0.6g--

Column 9, line 65, replace "As" by --From the specimens of this first case it is--;

Column 11, line 4, replace "vermiculate " by -- virmiculite--

Column 11, line 57 (1st line beneath Table 8) replace "with" by --on--;
line 59, delete "wearing"; before "test" insert --wearing--;

Column 13, line 8, replace "talc" by --Talc--;

Column 13, line 22, replace "5 to 5  vol.% "  --5 to 25 vol.%--,
Table 5-1, in column 8, line 48, replace "occurence" by --occurrence--

Signed and Sealed this

Sixteenth Day of August, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,266,395
DATED : November 30, 1993
INVENTOR(S) : Yukinori Yamashita et al It is certified that error appears in the above-indentified patent and that said Letters Patent is hereby corrected as shown below:

Col. 11, line 4, replace "virmiculate" by —vermiculite—

Signed and Sealed this

Eleventh Day of October, 1994

Attest:

BRUCE LEHMAN

Attesting Officer     Commissioner of Patents and Trademarks